United States Patent
Choi et al.

(10) Patent No.: US 9,571,197 B2
(45) Date of Patent: Feb. 14, 2017

(54) MOBILE COMMUNICATION REPEATER INTEGRATED MONITOR DEVICE, AND METHOD AND SYSTEM FOR MOBILE COMMUNICATION RELAY AND INFORMATION PROVISION

(75) Inventors: Jeong-Keun Choi, Jeollabuk-do (KR); Jong-Ho Park, Gyeonggi-do (KR)

(73) Assignee: KT Corporation, Seongnam-si (KR)

( * ) Notice: Subject to any disclaimer, the term of this patent is extended or adjusted under 35 U.S.C. 154(b) by 171 days.

(21) Appl. No.: 14/345,552

(22) PCT Filed: Apr. 4, 2012

(86) PCT No.: PCT/KR2012/002502
§ 371 (c)(1),
(2), (4) Date: Mar. 18, 2014

(87) PCT Pub. No.: WO2013/039287
PCT Pub. Date: Mar. 21, 2013

(65) Prior Publication Data
US 2014/0341569 A1    Nov. 20, 2014

(30) Foreign Application Priority Data

Sep. 16, 2011   (KR) .......................... 10-2011-0093648

(51) Int. Cl.
*H04B 10/00* (2013.01)
*H04B 10/29* (2013.01)
(Continued)

(52) U.S. Cl.
CPC .......... *H04B 10/29* (2013.01); *H04B 10/0795* (2013.01); *H04B 10/25753* (2013.01); *H04J 14/0227* (2013.01); *H04B 7/155* (2013.01)

(58) Field of Classification Search
CPC ..................... H04B 10/2575; H04B 10/25753; H04J 14/023; H04J 14/0232; H04J 14/0235; H04J 14/0238; H04J 14/0239; H04J 14/0245
(Continued)

(56) References Cited

U.S. PATENT DOCUMENTS

| 6,895,185 B1 * | 5/2005 | Chung ................. H04B 10/272 398/115 |
| 2006/0045525 A1 * | 3/2006 | Lee .................. H04B 10/25752 398/71 |

(Continued)

FOREIGN PATENT DOCUMENTS

| JP | 2010-269868 A | 12/2010 |
| KR | 10-2006-0009431 A | 2/2006 |

(Continued)

OTHER PUBLICATIONS

Office Action for Korean Patent Application No. 10-2011-0093648 dated Oct. 29, 2013.

*Primary Examiner* — Hanh Phan
(74) *Attorney, Agent, or Firm* — Sughrue Mion, PLLC

(57) ABSTRACT

An integrated mobile communication repeater monitoring device, and method and system for mobile communication relay and information provision, is provided. Signals received from communication networks are divided into signals of mobile communication channels and signals of data channels, mobile communication services are provided to on the basis of the signals of the mobile communication channels, and data is displayed on the basis of the signals of the data channels.

11 Claims, 5 Drawing Sheets

(51) Int. Cl.
*H04B 10/2575* (2013.01)
*H04B 10/079* (2013.01)
*H04J 14/02* (2006.01)
*H04B 7/155* (2006.01)

(58) Field of Classification Search
USPC ........ 398/66, 67, 68, 69, 70, 71, 72, 76, 79, 98, 398/99, 100, 115, 116, 117, 33, 34, 37, 38; 370/352, 392, 389, 468, 328; 455/561, 455/562.1, 422, 422.1
See application file for complete search history.

(56) References Cited

U.S. PATENT DOCUMENTS

2006/0182446 A1\* 8/2006 Kim ................ H04B 10/25752
398/72
2010/0040372 A1\* 2/2010 Gejbrowitz ...... H04B 10/25754
398/71

FOREIGN PATENT DOCUMENTS

| KR | 10-0645356 B1 | 11/2006 |
| KR | 10-0725237 B1 | 6/2007 |
| KR | 10-2009-0027802 A | 3/2009 |
| KR | 10-0895177 B1 | 5/2009 |

\* cited by examiner

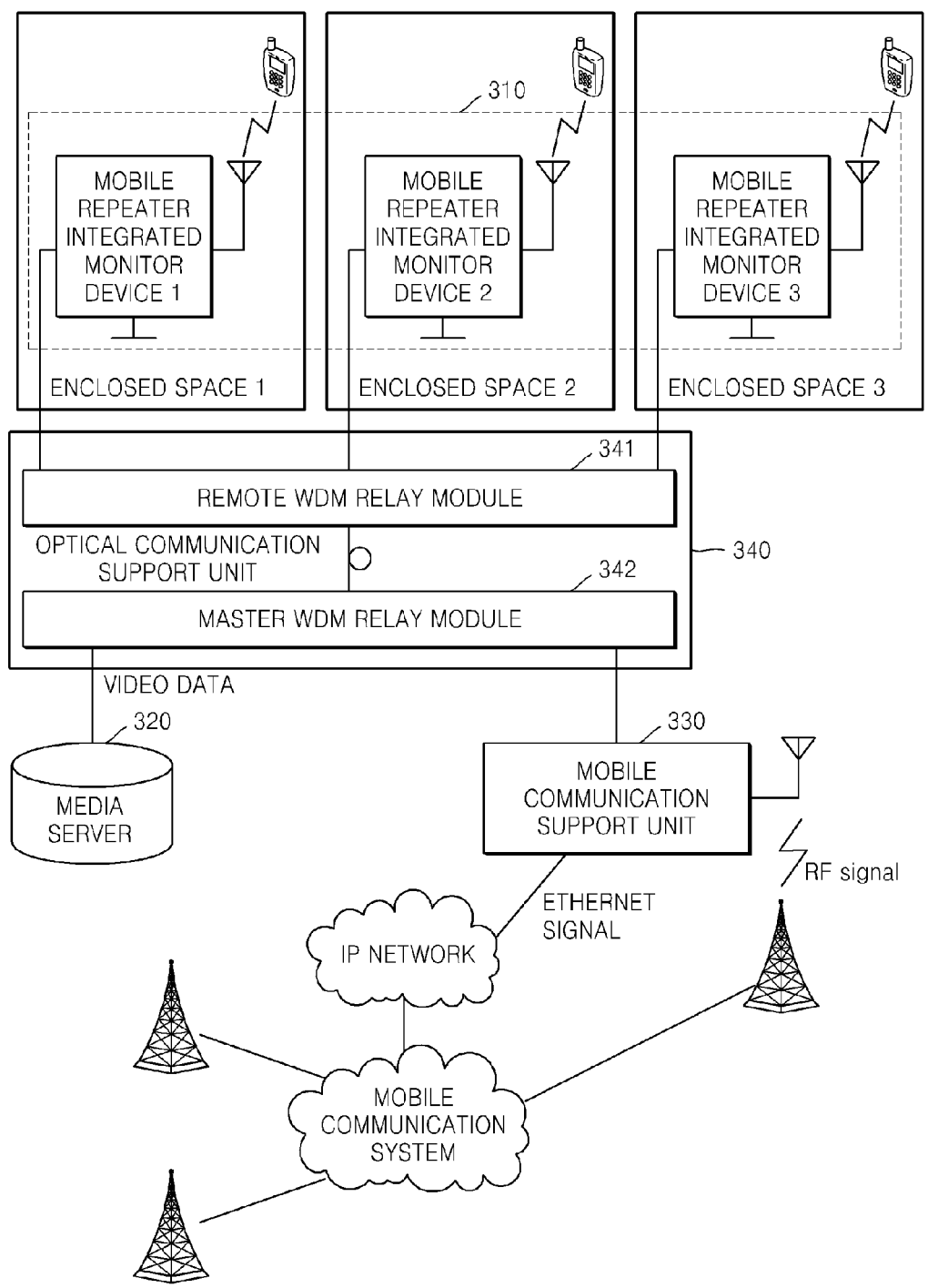

| MEASURED DATA BEFORE INSTALLATION 610 | | → | MEASURED DATA AFTER INSTALLATION 620 | |
|---|---|---|---|---|
| ITEM | MEASURED VALUE (dB) | | ITEM | MEASURED VALUE (dB) |
| Ec/Io | 0 | | Ec/Io | −6 |
| RSCP | 0 | | RSCP | −91 |
| RSSI | 0 | | RSSI | −84 |

MOBILE COMMUNICATION REPEATER INTEGRATED MONITOR DEVICE, AND METHOD AND SYSTEM FOR MOBILE COMMUNICATION RELAY AND INFORMATION PROVISION

CROSS-REFERENCE TO RELATED APPLICATIONS

This application is a National Stage of International Application PCT/KR2012/002502, filed on Apr. 4, 2012, which claims priority from Korean Patent Application No. 10-2011-0093648, filed on Sep. 16, 2011, in the Korean Intellectual Property Office, the entire disclosures of which are incorporated herein by reference.

BACKGROUND

1. Field

Apparatuses, methods, and systems consistent with exemplary embodiments relate to an integrated mobile communication repeater monitoring device, and method and system for mobile communication relay and information provision, and more particularly, to an apparatus, method, and system for providing mobile communication services to enclosed spaces and displaying information such as externally provided advertisements and announcements in the enclosed spaces.

2. Background

A general mobile communication service includes a process of transmitting and receiving wireless mobile communication signals between a mobile communication terminal and a mobile communication base station connected to a mobile communication system. A mobile communication service location is divided into a plurality of cell units based on the coverage of the mobile communication base station to be located in each cell unit, and the mobile communication base station is located at the center of each cell unit. However, after mobile communication signals are transmitted from the mobile communication base station, the mobile communication signals are diffracted or the mobile communication signals are lost due to interference by other wireless signals. In particular, in a metallically enclosed elevator space or an enclosed space such as a base station facility, the quality of the mobile communication service is low, thereby inconveniencing users of the mobile communication service.

In order to improve the above-described problems, repeaters for amplifying signals transmitted by the base station and transmitting the amplified signals to the mobile communication terminal have been installed. For example, in a conventional scheme, an RF repeater is installed at each entrance located outside the elevator of each floor in order to provide mobile communication service inside the elevator (i.e., the enclosed space) enclosed spaces. However, such a conventional scheme requires many RF repeaters, resulting in increased costs.

SUMMARY

Exemplary embodiments provide an integrated mobile communication repeater monitoring device, method, and system for effectively performing communication between the inside and outside of enclosed spaces by providing a mobile communication service through a single device installed inside the enclosed spaces, continually monitoring the environment in which the mobile communication service is provided, and displaying externally provided advertisements and announcements in the enclosed spaces.

According to exemplary embodiments, mobile communication coverage is extended by providing a mobile communication service in enclosed spaces, communication between the enclosed spaces and the outside is restored by providing externally provided advertisements or announcements to the enclosed spaces in order to enhance satisfaction and convenience of the user, and the installation and maintenance costs are reduced by installing only one device in each of the enclosed spaces.

According to one or more exemplary embodiments, an integrated mobile communication repeater monitoring device includes: a relayer configured to transmit and receive first signals through a communication network, and separates the first signals received through the communication network into second signals of a mobile communication channel and third signals of a data channel; a data displayer configured to display data within the enclosed space based on the third signals of the data channel received from the optical relayer; and a terminal transmission and reception unit including a mobile communication repeater or a mobile communication base station configured to transmit and receive high frequency wireless signals to and from a mobile communication terminal.

According to one or more exemplary embodiments, a mobile communication relay and information provision method includes: receiving first signals through a communication network; separating the received first signals into second signals of a mobile communication channel and third signals of a data channel; displaying the third signals of the data channel within the enclosed space through an image output device; converting the second signals of the mobile communication channel into high frequency wireless signals by using a mobile communication repeater or a mobile communication base station, and transmitting the high frequency wireless signals to a mobile communication terminal located in the enclosed space; and collecting state information including an intensity of the transmitted high frequency wireless signals and a power on/off state of the image output device, and transmitting the collected state information to the communication network.

According to one or more exemplary embodiments, a mobile communication relay and information provision system includes: a plurality of integrated mobile communication repeater monitoring devices, display data, and transmit and receive mobile communication signals to and from a mobile communication terminal; a media server which provides data displayed by the integrated mobile communication repeater monitoring devices; a mobile communication support unit which transmits and receives mobile communication signals through an IP network or a mobile communication base station; and a communication support unit which: combines mobile communication signals which the communication support unit receives from the mobile communication support unit and data signals which the communication support unit receives from a media server, resulting in first combined signals, and transmits the first combined signals to the plurality of plurality of integrated mobile communication repeater monitoring devices to provide mobile communication service, and combines mobile communication signals which the communication support unit receives from the monitor devices for the mobile communication service, resulting in second combined signals, and transmits the second combined signals to the mobile communication support unit.

BRIEF DESCRIPTION OF THE DRAWINGS

FIG. 3 illustrates a mobile communication relay and information provision system according to an exemplary embodiment.

DETAILED DESCRIPTION

Exemplary embodiments are described below. Hence, though not clearly described or illustrated, those of ordinary skill in the art may invent various devices which implement the principles of the present invention and are included in the concept and scope of the present invention. Furthermore, all conditional terms and exemplary embodiments are used only for the purpose of helping understand the concept of the present invention. Furthermore, all detailed descriptions of the principles and exemplary embodiments are intended to include structural and functional equivalents. Furthermore, such equivalents include currently known equivalents and equivalents to be developed in the future, i.e., all devices which have been invented to perform the same function regardless of the structure.

The described objects, features, and advantages will be made clearer through the related detailed description below. When the specific description of the related art unnecessarily obscures the gist of the present invention, the detailed description may be omitted.

When a certain part is described to "include" a component, it does not exclude other components unless stated otherwise, and it may include other components.

Hereinafter, the exemplary embodiments will be described in detail with reference to the attached drawings.

In the description below, a forward link refers to a route in a direction from a mobile communication system to a mobile communication terminal, and a reverse link refers to a reverse direction path of the forward link. Furthermore, a mobile communication signal refers to an all-inclusive name for expressing an upper concept including an optical signal, an Ethernet signal, and a radio frequency (RF) signal.

Figure 1:
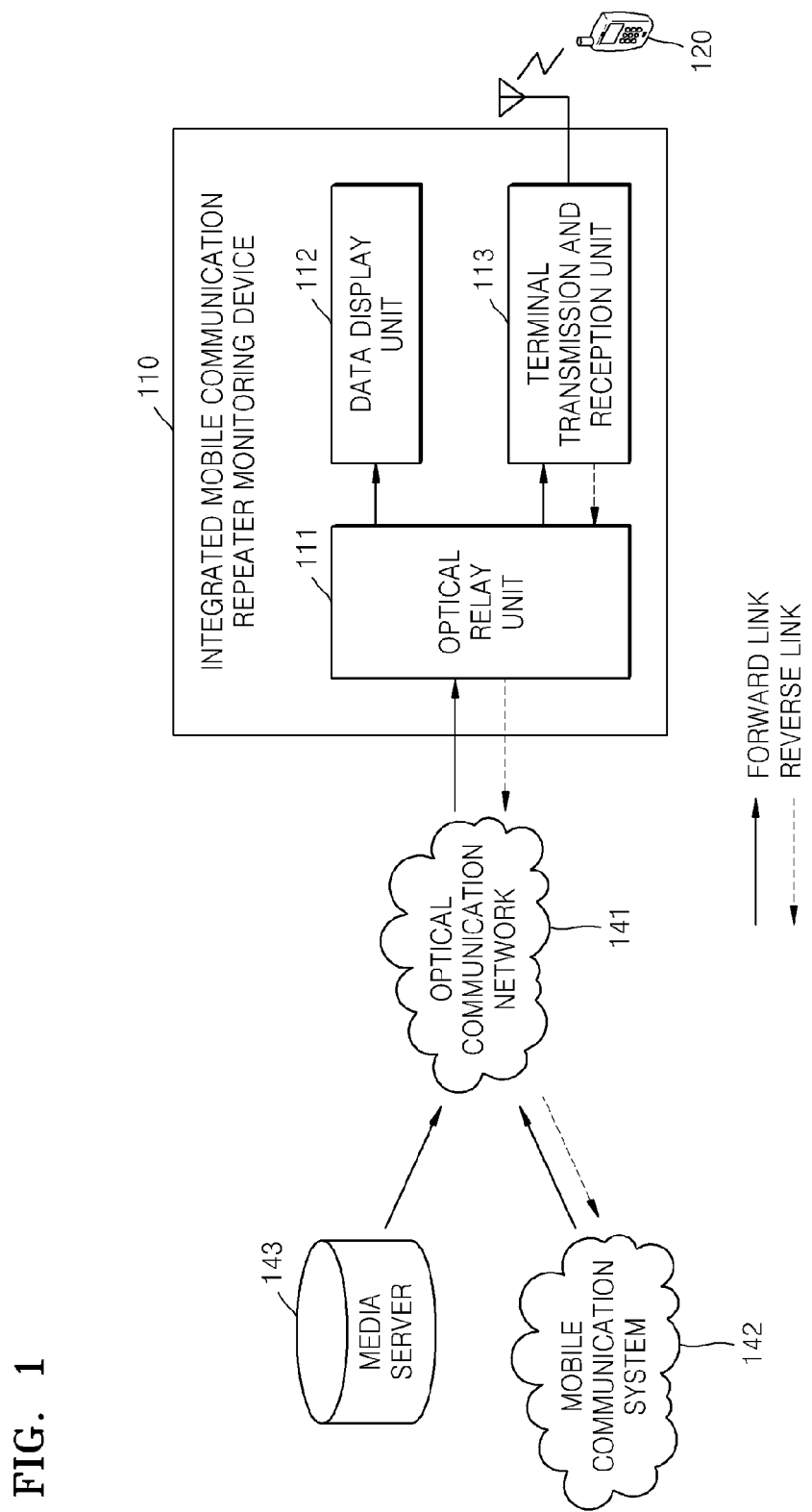
FIG. 1 illustrates an integrated mobile communication repeater monitoring device according to an exemplary embodiment.

FIG. 1 is a diagram illustrating an integrated mobile communication repeater monitoring device according to an exemplary embodiment.

Referring to FIG. 1, an integrated mobile communication repeater monitoring device 110 and a mobile communication terminal 120 are positioned within an enclosed space. The mobile communication relay integrated monitor device 110 includes an optical relay unit 111 (e.g., optical relayer), a data display unit 112, and a terminal transmission and reception unit 113. The optical relay unit 111, the data display unit 112 (e.g., data displayer), and the terminal transmission and reception unit 113 are mounted in the mobile communication relay integrated monitor device 110 and share a main body.

The optical relay unit 111 transmits and receives an optical signal through an optical communication network 141 which is connected to an external part of each of the enclosed spaces. The optical communication network 141 serves as a medium for signal transmission between the optical relay unit 111 and a mobile communication system (not shown) and between the optical relay unit 111 and a media server 143. The optical signal, which the optical relay unit 111 receives from the optical communication network 141, refers to an optical signal which is generated by integration of a plurality of optical signals including an optical signal of a mobile communication channel and an optical signal of a data channel. A control channel may exist in addition to the mobile communication channel and a data channel in the channel of the received optical signal.

The mobile communication channel is a channel for transmitting a mobile communication signal of the forward link which is transmitted from the mobile communication system 142, and the data channel is a channel for transmitting data which is provided by the media server 143. The control channel is a channel for transmitting a control signal to the terminal transmission and reception unit 113 when the terminal transmission and reception unit 113 includes a control module. The band of each of the mobile communication channel, the data channel and the control channel is selected at a range within which the optical relay unit 111 may receive. The optical relay unit 111 includes a wavelength division multiplexing (WDM) coupling unit in which a plurality of optical signals having different wavelengths are combined, and a WDM separation unit where coupled signals are separated according to their respective optical wavelengths. The optical relay unit 111 filters the optical signals received from the optical communication network 141 according to their respective optical wavelengths in order to obtain the optical signal of the mobile communication channel, the optical signal of the data channel, and the optical signal of the control channel in parallel. The optical signal of the data channel is transmitted to the data display unit 112, and the optical signal of the mobile communication channel and the optical signal of the control signal of the forward link are transmitted to the terminal transmission and reception unit 113.

The data display unit 112 outputs a data signal received from the optical relay unit 111 in order to provide information to people inside the enclosed space. The provided information may include advertisements, news, weather forecasts, and video information. In order to output data signals, the data display unit 112 includes an image output device which displays photographs and image signals. For example, an LCD or LED device may be utilized as the image output device. The data signals are not limited to image signals, and may include voice signals. In order to output data signals including voice signals, the data display unit 112 may include a speaker.

The data display unit 112 may include a function of outputting externally transmitted data to enclosed spaces, and may include a microphone module or a camera module to transmit information regarding the enclosed spaces to the outside. The microphone module may perform an interphone function of transmitting voices of people inside the close space to the outside, and the camera module may be utilized as a CCTV system for observing the inside of the enclosed space in real time. The microphone module or the camera module transmits voice or image data signals to the optical relay unit 111 in the form of optical signals. The optical relay unit 111 transmits optical signals, which are generated by integrating data signals transmitted from the microphone module or the camera module with mobile communication signals of the reverse link in a wavelength division multiplexing (WDM) scheme, to the optical communication network 141.

Figure 2A:
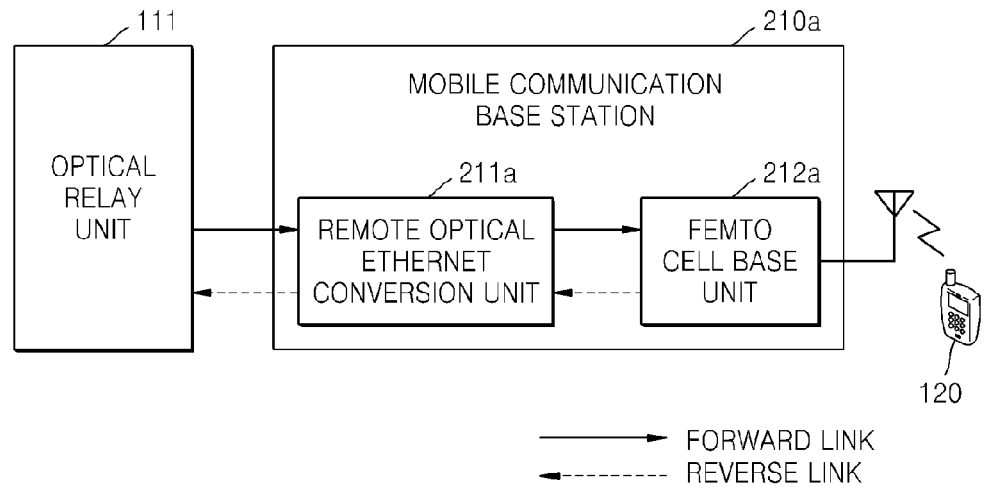
FIG. 2A illustrates a mobile communication base station included in the integrated mobile communication repeater monitoring device according to an exemplary embodiment.
Figure 2B:
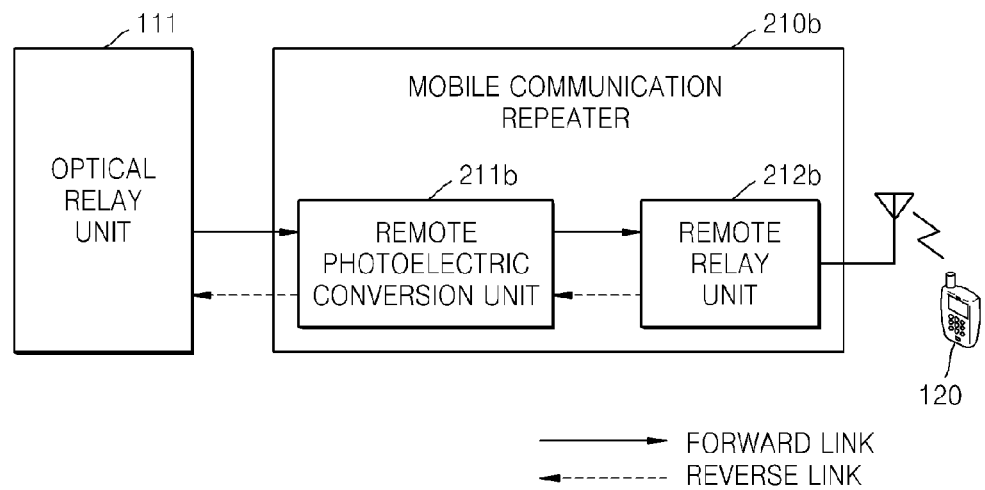
FIG. 2B illustrates a mobile communication repeater included in the integrated mobile communication repeater monitoring device according to an exemplary embodiment.

The terminal transmission and reception unit 113 includes a mobile communication module (not shown), and may include a state monitoring module (e.g., state monitor) and a control module (both of which are not shown) depending on the embodiment. The mobile communication module provides the mobile communication service to a user inside of the enclosed space by transmitting and receiving mobile communication signals to and from the mobile communication terminal 120 by having a mobile communication repeater 210a or a mobile communication base station 210b, as shown in FIGS. 2A and 2B. The state monitoring module collects state information including the intensity of the mobile communication signals transmitted by the mobile communication module and the power on/off state of the data display unit 112, and transmits the collected state information to the optical relay unit 111. The control module blocks or allows the supply of power to the data display unit 112, and adjusts the intensity and gain value of the mobile communication signals transmitted by the mobile communication module.

The mobile communication module converts optical signals of the mobile communication channel, which are received from the optical relay unit 111, into high frequency wireless signals so that the converted high frequency signals may be transmitted to the mobile communication terminal 120, and converts high frequency wireless signals received from the mobile communication terminal 120 into optical signals so that the optical signals may be transmitted to the optical relay unit 111. The mobile communication signal, which is provided by the mobile communication module, follows current second generation, third generation, and fourth generation standards for providing mobile communication, and the mobile communication standard used in exemplary embodiments may be changed according to mobile communication standards that are developed in the future. Details about the case where the mobile communication module forms a mobile communication repeater and the case where the mobile communication module forms a mobile communication base station will be described later with reference to FIGS. 2A and 2B.

The state monitoring module collects state information by monitoring the operation of the data display unit 112 and the mobile communication module and the mobile communication environment inside the enclosed space. The state information about the operation of the data display unit 112 may include power on/off information, brightness, contrast, and resolution of an image output device, a gain and sensitivity of sound signals which are input to the microphone module, and an angle, resolution, brightness, and contrast of an image taken by the camera module. The state information about the mobile communication module may include the size of the wireless high frequency signal, the chip energy per others interference (Ec/Io), and the hardware information of the gain as indicators of the quality of the mobile communication environment within the enclosed spaces. The collected state information is transmitted to the optical communication network through the optical relay unit 111. Here, the optical relay unit 111 combines the collected state information with the mobile communication signal of the reverse link and transmits the result of the combination. The mobile communication system manager located outside of the enclosed spaces may monitor the operating state of the integrated mobile communication repeater monitoring device 100 located in the enclosed spaces by using the state information among signals received from the optical relay unit 111.

The control module changes the hardware setting of the integrated mobile communication repeater monitoring device 110 based on the collected state information. The control module may be set to automatically set the hardware setting according to a program that is input in advance or to allow manual control of the hardware setting according to instructions given by the person in charge. In the case of automatically setting the hardware setting, if the analyzed Echo value is less than a predetermined value, the program that is input in advance may be executed to increase the intensity of a wireless high frequency signal, which is output from the mobile communication module, thus providing a mobile communication service. When installing an automated program, a separate control signal is not received from the outside of enclosed spaces of the mobile communication module. Furthermore, when the manager located outside the enclosed spaces manually performs control, the control module receives a control signal from the optical relay unit 111. Here, the optical signal received through the optical communication network refers to a signal which is generated by combining a mobile communication signal, a data signal, and a control signal. The optical relay unit 111 separates each signal and provides the control signal to the control module. The control module may turn on/off the power of the data display unit 112, or adjust the brightness, contrast, resolution of the image output device, the gain and sensitivity of sound signals which are input to the microphone module, and the angle, resolution, brightness, and contrast of the image which is taken by the camera module. Furthermore, the mobile communication service within the enclosed space may be provided by increasing or reducing the size and the gain of the wireless high frequency signal which is transmitted or received. When the Echo value which is analyzed from the state information is less than a predetermined value, it is determined that the mobile communication service is not smooth, and the manager may increase the intensity of the wireless high frequency signal to improve the mobile communication environment within the enclosed space. The size of the transmitted mobile communication signal may be adjusted as necessary to conform to legal standards. For example, in the case of an internal side of a general elevator, a signal level of less than 7 dB may be appropriate. If there is no person located within the enclosed space, energy waste may be minimized by putting the integrated mobile communication repeater monitoring device 110 into a standby mode.

When a monitor including the data display unit 112 for displaying advertisements and announcements within the enclosed space is already installed inside of the enclosed space, the integrated mobile communication repeater monitoring device of the exemplary embodiments may be implemented in a manner that combines the optical relay unit 111 with the terminal transmission and reception unit by adding the data display unit 112 to the monitor which is already installed, and thus costs are reduced because the existing equipment (i.e., the monitor) is used.

FIG. 2A is a diagram schematically illustrating a mobile communication base station included in the integrated mobile communication repeater monitoring device according to an exemplary embodiment.

Referring to FIG. 2A, a mobile communication base station 210a includes a remote optical Ethernet conversion unit 211a and a femto cell base unit 212a.

The remote optical Ethernet conversion unit 211a receives optical signals of the mobile communication channel of the forward link from the optical relay unit 111, converts the received optical signals into an Ethernet signal, and provides the converted Ethernet signal to the femto cell base unit 212a. An Ethernet signal provided from the femto cell base unit 212a via the reverse link is converted into an optical signal, and the optical signal is transmitted to the optical relay unit 111.

The femto cell base unit 212a includes a femto cell module which provides the mobile communication service by functioning as a mobile communication base station which uses the cell of the narrow range as a coverage area based on the Ethernet signal of the forward link. The femto cell base unit 212a converts the Ethernet signal of the forward link into a wireless high frequency signal in order to transmit the high frequency signal to the mobile communication terminal 120, and converts a wireless high frequency signal received from the mobile communication terminal 120 into an Ethernet signal in order to transmit the Ethernet signal to the remote optical Ethernet conversion unit 211a.

FIG. 2B is a diagram schematically illustrating a mobile communication repeater included in the integrated mobile communication repeater monitoring device according to an exemplary embodiment.

Referring to FIG. 2B, a mobile communication repeater 210b includes a remote photoelectric conversion unit 211b (e.g., remote photoelectric converter) and a remote relay unit 212b.

The remote photoelectric conversion unit 211b receives optical signals of the mobile communication channel of the forward link from the optical relay unit 111, converts the received optical signals into high frequency electrical signals, transmits the high frequency electrical signals to the remote relay unit 212b, and also converts high frequency electrical signals of the reverse link received from the remote relay unit 212b into optical signals and transmits the optical signals to the optical relay unit 111.

The remote relay unit 212b wirelessly transmits the electric high frequency signal of the forward link, which is received from the remote photoelectric conversion unit 211b, to the mobile communication terminal 120, and converts the wireless high frequency signal received from the mobile communication terminal 120 to an electric high frequency signal in order to transmit the electric high frequency signal to the remote photoelectric conversion unit 211b. That is, the mobile communication signal is relayed to the mobile communication terminal 120. The remote relay unit 211b may include an RF antenna, a duplexer, an amplifier, and an attenuator.

The mobile communication base station 210a of FIG. 2A forms a station which uses an enclosed space as one cell, but the mobile communication repeater 210b of FIG. 2B repeats the mobile communication signal received from an external base station to an enclosed space, which is a major difference between the mobile communication base station 210a and the mobile communication repeater 210b. The scheme of connecting the optical communication network 141 to the mobile communication system 142 is changed depending on the configuration of the terminal transmission and reception unit 113. According to the mobile communication base station scheme which uses the mobile communication base station 210a, the integrated mobile communication repeater monitoring device 110 accesses the mobile communication system 142 using the IP network, i.e., Internet protocol network, and according to the mobile communication base station which uses the mobile communication repeater 210b, the optical communication network 141 accesses the mobile communication system using the mobile communication base station which is located at the outside.

FIG. 3 is a diagram illustrating a mobile communication relay and information provision system according to an exemplary embodiment.

Referring to FIG. 3, the mobile communication relay and information provision system according to the exemplary embodiment includes a plurality of integrated mobile communication repeater monitoring devices 310, a media server 320, a mobile communication support unit 330, and an optical communication support unit 340.

The integrated mobile communication repeater monitoring device 310 receives optical signals from the optical communication support unit 340 in order to provide the mobile communication service within the enclosed space and display the data. The constitution of the integrated mobile communication repeater monitoring device 310 was described above with reference to FIGS. 1 to 2B.

The media server 320 includes a recording medium having recorded therein data to be provided to the mobile communication relay integrated monitor device 310, and receives data from the manager in order to transmit the data to the optical communication support unit 340. The data may include both image and voice signals. If the media server 320 is connected to the IP network, the mobile communication system manager may access the media server 320 via the IP network, and thus the data may be input, corrected or deleted, or the recorded data may be checked. When the integrated mobile communication repeater monitoring device 310 includes a camera module, the media server 320 receives and records the image inside the enclosed space.

The mobile communication support unit 330 accesses the mobile communication system through the IP network or the mobile communication base station. The mobile communication support unit 330 transmits the mobile communication signal of the forward link received from the mobile communication system, and transmits the mobile communication signal of the reverse link received from the optical communication support unit 340 to the mobile communication system through the IP network or the mobile communication base station.

The mobile communication support unit 330 is formed differently depending on whether the terminal transmission and reception unit 113 forms a base station or a repeater. When the terminal transmission and reception unit 113 forms the mobile communication base station including the remote optical Ethernet conversion unit 211a and the femto cell base unit 212a as shown in FIG. 2A, the mobile communication support unit 330 accesses the mobile communication system through the IP network. In order to transmit and receive the IP network and Ethernet signal, the mobile communication support unit 330 includes an optical Ethernet conversion device which converts an Ethernet signal received from the IP network into an optical signal and converts an optical signal of the reverse link into an Ethernet signal.

On the other hand, the constitution of the mobile communication support unit 340 when the terminal transmission and reception unit 133 forms a repeater including the remote photoelectric conversion unit 211b and the remote relay unit 212b as shown in FIG. 2B, will be described later with reference to FIG. 5.

The optical communication support unit 340 provides an optical signal, which is generated by combining respective signals received from the media server 320 and the mobile communication support unit 330, to the integrated mobile communication repeater monitoring device 310. The optical communication support unit 340 includes WDM relay modules 341 and 342 of the optical wavelength division multiplexing scheme. The remote WDM relay module 341 transmits optical signals of the forward link to a plurality of mobile communication relay integrated monitor devices 310, and combines a plurality of signals received from the plurality of mobile communication relay integrated monitor devices 310. The master WDM relay module 342 receives an optical signal of the reverse link from the remote WDM relay module 341 in order to transmit the optical signal to the mobile communication support unit 330, and when the integrated mobile communication repeater monitoring device 310 includes a camera module or a microphone module, the data signal transmitted by the integrated mobile communication repeater monitoring device 310 is provided to the media server 320. Furthermore, the master WDM relay module 342 combines respective signals received from the media server 320 and the mobile communication support unit 330 and transmits the combined signals to the remote WDM relay module 341.

Figure 4:
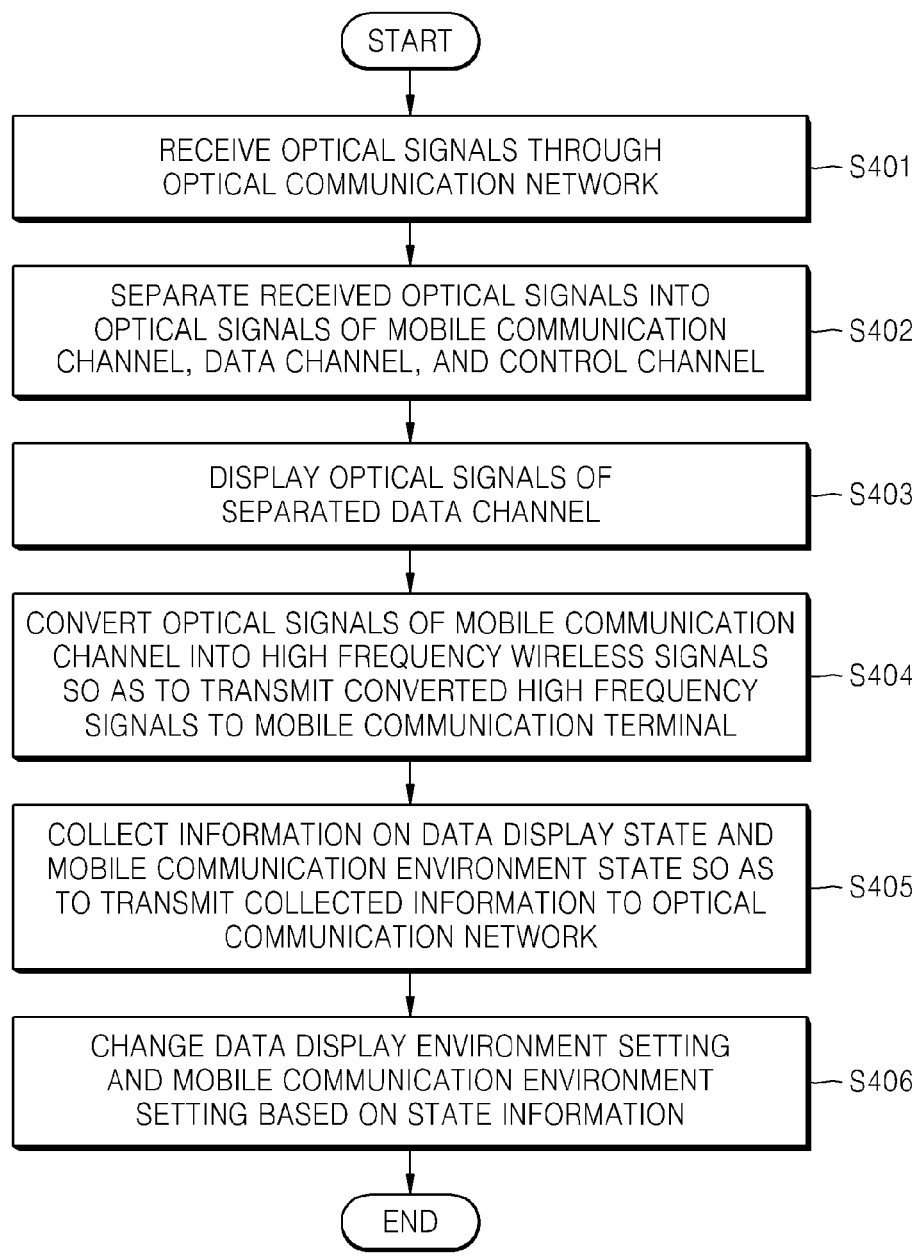
FIG. 4 illustrates a mobile communication relay and information provision method according to an exemplary embodiment.

FIG. 4 is a flowchart illustrating a mobile communication relay and information provision method according to an exemplary embodiment.

Referring to FIG. 4, first, the integrated mobile communication repeater monitoring device 110 receives the optical signal through the optical communication network (S401). The received optical signal includes a mobile communication signal transmitted from the mobile communication system and a data signal transmitted from the media server 143. In an exemplary embodiment, when the integrated mobile communication repeater monitoring device 110 includes a control module, the received optical signal may further include a control signal.

The integrated mobile communication repeater monitoring device 110 separates the received optical signal into an optical signal of the mobile communication channel and an optical signal of the data channel (S402). When the control channel is allocated, the optical signal of the control channel is separated together.

The integrated mobile communication repeater monitoring device 110 displays the optical signal of the separated data channel through an image output device (S403).

The integrated mobile communication repeater monitoring device 110 converts the optical signal of the separated mobile communication channel into a wireless high frequency signal, and transmits the converted high frequency signal into the mobile communication terminal located in the enclosed space (S404). The integrated mobile communication repeater monitoring device 110 includes a mobile communication repeater which forms a mobile communication base station of a femto cell scheme having a narrow coverage area or which amplifies or attenuates mobile communication signals to be relayed in order to transmit and receive those mobile communication signals to and from the mobile communication terminal.

The integrated mobile communication repeater monitoring device 110 collects state information including the intensity of the transmitted wireless high frequency signal and the power on/off state of the image output device and transmits the collected state information to the optical communication network (S405).

The integrated mobile communication repeater monitoring device 110 makes a decision according to the collected state information to change the hardware setting, or changes the hardware setting according to a decision made by the integrated mobile communication repeater monitoring device 110 according to the collected state information or according to the control signal received from the optical communication relay unit 111 (S406). For example, power is supplied or blocked to the image output device, and the intensity of the wireless high frequency signal transmitted by the mobile communication repeater or mobile communication base station is increased or decreased. When the integrated mobile communication repeater monitoring device 110 includes a control module, the integrated mobile communication repeater monitoring device 110 changes the hardware setting of the data display unit 112 and the terminal transmission and reception unit 113 according to the received control signal.

Figures 5, 6:
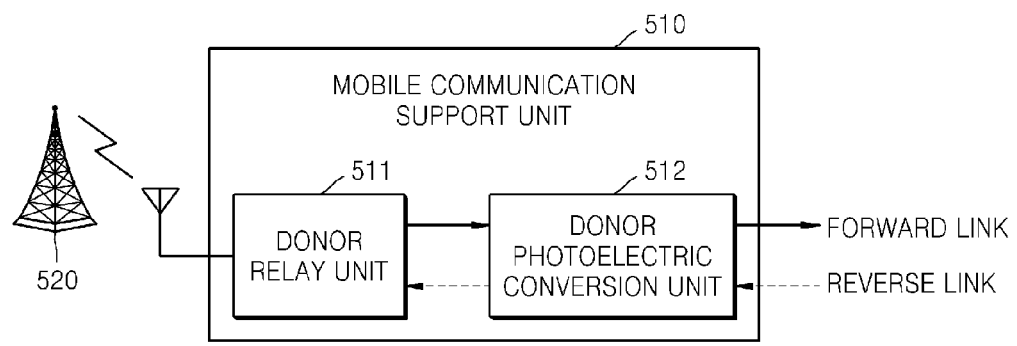
FIG. 5 illustrates a mobile communication support unit of a mobile communication relay and information provision system according to an exemplary embodiment.
FIG. 6 illustrates the result of quality measurement of a mobile communication relay and information provision method according to an exemplary embodiment.

FIG. 5 is a diagram illustrating a mobile communication support unit of a mobile communication relay and information provision system according to an exemplary embodiment.

Referring to FIG. 5, the mobile communication support unit 510 includes a donor relay unit 511 and a donor photoelectric conversion unit 512, based on an assumption that the terminal transmission and reception unit 113 functions not as a base station, but as a mobile communication repeater.

The donor relay unit 511 transmits and receives high frequency wireless signals to and from the mobile communication base station 520. The wireless high frequency signal of the forward link received from the mobile communication base station 520 is converted into a electric high frequency signal in order to be provided to the donor photoelectric conversion unit 512, and an electric high frequency signal received from the donor photoelectric conversion unit 512 is wirelessly transmitted to the mobile communication base station 520. The donor relay unit 511 may include an RF antenna, a duplexer, an amplifier, and an attenuator.

The donor photoelectric conversion unit 512 converts the electric high frequency signal of the forward link received from the donor relay unit 511 into optical signals in order to transmit the converted optical signals to the optical communication support unit 340, and converts the optical signals of the reverse link received from the optical communication support unit 340 into high frequency electrical signals in order to transmit the converted high frequency electrical signals to the donor relay unit 511.

FIG. 6 is a diagram illustrating the result of quality measurement of a mobile communication relay and information provision method according to an exemplary embodiment. FIG. 6 shows the values of measured signals inside of an elevator for a case where the terminal transmission and reception unit 113 is formed according to a repeater scheme of FIG. 2B in the integrated mobile communication repeater monitoring device 110.

Referring to FIG. 6, chip energy per others interference (Ec/Io), received signal code power (RSCP), and received signal strength indicator (RSSI) may be checked based on measured data before installation 610 and measured data after installation 620.

Exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

The invention claimed is:

1. An integrated mobile communication repeater monitoring device comprising:
a relayer configured to transmit and receive first signals through a communication network, and separate the first signals received through the communication network into second signals of a mobile communication channel and third signals of a data channel;
a data displayer configured to display data based on the third signals of the data channel received from the relayer; and
a terminal transmission and reception unit including a mobile communication repeater or a mobile communication base station configured to transmit and receive high frequency wireless signals to and from a mobile communication terminal,
wherein the terminal transmission and reception unit further comprises:
a state monitor which collects state information including an intensity of a wireless high frequency signal transmitted by a mobile communication relayer or the mobile communication base station and a power on/off state of the data displayer, and transmits the collected state information to the relayer.

2. The integrated mobile communication repeater monitoring device of claim 1, wherein the relayer comprises:
a wavelength division multiplexing (WDM) separator configured to receive the first signals of a single channel which is obtained by combining a data channel and a mobile communication channel at different wavelengths from the communication network, and separate the first signals into the third signals of the data channel and the second signals of the mobile communication channel depending on respective wavelengths.

3. The integrated mobile communication repeater monitoring device of claim 1, wherein the mobile communication repeater of the terminal transmission and reception unit comprises:
a remote photoelectric converter which converts the second signals of the mobile communication channel of a forward link transmitted by the relayer into high frequency electrical signals, and converts high frequency electrical signals of a reverse link into fourth signals; and
a remote relayer which relays high frequency wireless signals to the mobile communication terminal by using a repeater which controls respective intensities of the high frequency electrical signals of the forward link of a wireless relay.

4. The device of claim 1, wherein the relayer comprises an optical relayer and the communication network is an optical communication network.

5. The device of claim 1, wherein the data is displayed within an enclosed space and the mobile communication terminal is located in the enclosed space.

6. An integrated mobile communication repeater monitoring device comprising:
a relayer configured to transmit and receive first signals through a communication network, and separate the first signals received through the communication network into second signals of a mobile communication channel and third signals of a data channel;
a data displayer configured to display data based on the third signals of the data channel received from the relayer; and
a terminal transmission and reception unit including a mobile communication repeater or a mobile communication base station configured to transmit and receive high frequency wireless signals to and from a mobile communication terminal,
wherein the terminal transmission and reception unit further comprises:
a controller which prevents or allows power to be supplied to the data displayer, and increases or decreases an intensity of the wireless high frequency signal transmitted by the mobile communication repeater or mobile communication base station.

7. An integrated mobile communication repeater monitoring device comprising:
a relayer configured to transmit and receive first signals through a communication network, and separate the first signals received through the communication network into second signals of a mobile communication channel and third signals of a data channel;
a data displayer configured to display data based on the third signals of the data channel received from the relayer; and
a terminal transmission and reception unit including a mobile communication repeater or a mobile communication base station configured to transmit and receive high frequency wireless signals to and from a mobile communication terminal,
wherein the mobile communication base station of the terminal transmission and reception unit comprises:
a remote optical Ethernet converter which converts the second signals of the mobile communication channel of a forward link transmitted by the relayer into Ethernet signals and converts Ethernet signals of a reverse link into fourth signals that are then transmitted to the relayer; and
a femto cell base unit which converts Ethernet signals of the forward link into high frequency wireless signals and transmits the converted high frequency signals to a mobile communication terminal located in an enclosed space, and converts high frequency wireless signals of a reverse link transmitted by the mobile communication terminal into Ethernet signals and transmits the converted Ethernet signals to the remote optical Ethernet converter.

8. A mobile communication relay and information provision method comprising:
receiving first signals through a communication network;
separating the received first signals into second signals of a mobile communication channel and third signals of a data channel;
displaying the third signals of the data channel through an image output device;
converting the second signals of the mobile communication channel into high frequency wireless signals by using a mobile communication repeater or a mobile communication base station, and transmitting the high frequency wireless signals to a mobile communication terminal; and
collecting state information including an intensity of the transmitted high frequency wireless signals and a power on/off state of the image output device, and transmitting the collected state information to the communication network.

9. The mobile communication relay and information provision method of claim 8, further comprising:

supplying or blocking power to the image output device by analyzing the collected state information, and increasing or decreasing respective intensities of high frequency wireless signals transmitted by the mobile communication repeater or the mobile communication base station.

10. The method of claim 8, wherein the communication network is an optical communication network.

11. The method of claim 8, wherein the third channels of the data channel are displayed within the enclosed space and the mobile communication terminal is located in the enclosed space.

* * * * *